United States Patent

Spadotto

[11] Patent Number: 5,358,314
[45] Date of Patent: Oct. 25, 1994

[54] WHEEL AND ROTATION SHAFT ASSEMBLY FOR A HOSE-WINDING CART

[75] Inventor: Oliviano Spadotto, Pordenone, Italy

[73] Assignee: Claber S.p.A., Italy

[21] Appl. No.: 74,549

[22] Filed: Jun. 11, 1993

[30] Foreign Application Priority Data

Jun. 15, 1992 [IT] Italy .................. MI92U000606

[51] Int. Cl.$^5$ .................................. B60B 37/00
[52] U.S. Cl. ...................... 301/111; 301/64.7; 301/122
[58] Field of Search ............. 301/111, 112, 118, 120, 301/122, 64.7, 105.1, 121; 16/45, 46

[56] References Cited

U.S. PATENT DOCUMENTS

| | | | |
|---|---|---|---|
| 2,717,807 | 9/1955 | Kapp | 301/111 X |
| 3,740,100 | 6/1973 | Perego | 301/121 |
| 4,530,543 | 7/1985 | Keane | 301/64.7 |
| 4,544,425 | 10/1985 | Provoco | 301/122 X |
| 5,014,392 | 5/1991 | Melara | 301/122 X |
| 5,046,520 | 9/1991 | Sanchez, Jr. et al. | |
| 5,188,430 | 2/1993 | Chiu | 301/111 |
| 5,222,786 | 6/1993 | Sovis et al. | 301/64.7 X |
| 5,224,961 | 7/1993 | Liu | 301/111 |
| 5,277,480 | 1/1994 | Chiu | 301/111 |

FOREIGN PATENT DOCUMENTS

| | | |
|---|---|---|
| 0336802 | 10/1989 | European Pat. Off. . |
| 8804621 | 7/1988 | Fed. Rep. of Germany . |
| 4110655 | 3/1992 | Fed. Rep. of Germany . |
| 0104103 | 8/1979 | Japan ............. 301/111 |
| 909161 | 10/1962 | United Kingdom ....... 301/64.7 |

*Primary Examiner*—Russell D. Stormer
*Attorney, Agent, or Firm*—Nixon & Vanderhye

[57] ABSTRACT

A wheel and rotation shaft assembly comprises a rotation shaft (2), a wheel (1), and a blocking device (3). The wheel has an axial center hole (8) passing therethrough to receive the rotation shaft. A circumferential series of elastic laminas (11) are provided on the wheel to extend into the axial hole at an extremity of the axial hole. The blocking device has an axially extending first portion (14), a head portion (16), and a second portion (15). The blocking device is fitted with the rotation shaft prior to reception of the rotational shaft by the wheel. The blocking device terminal head portion is engaged by the elastic laminas of the wheel after reception of the rotational shaft and blocking device by the wheel.

7 Claims, 2 Drawing Sheets

0
WHEEL AND ROTATION SHAFT ASSEMBLY FOR A HOSE-WINDING CART

BACKGROUND OF THE INVENTION

I. Field of the Invention

The present invention relates to a wheel and rotation shaft assembly for a hose-winding cart.

II. Related Art and Other Considerations

Hose-winding carts are used for winding irrigation hoses, and typically comprise a supporting structure (or chassis), a drum for winding the hose, and two wheels.

In prior hose-winding carts, the wheels are fastened to a rotation shaft (which forms part of the supporting structure). The wheels are typically mounted by means of bolts, screws or other coupling means that are mounted after the wheel has been fitted on the rotation shaft itself.

Such a technique, however, disadvantageously slows assembly of the wheel and rotation shaft. This is a fairly unpleasant drawback, especially since hose-winding carts are frequently sold to the public not fully assembled.

Moreover, even after assembly a fastening element may become unfastened and then be lost, thereby rendering the cart immobile.

Accordingly, it is an object of the present invention to provide a wheel and rotation shaft assembly for a hose-winding cart that provides a simplified and secure system for the assembly and retention of its component parts.

SUMMARY OF THE INVENTION

According to the invention, such object is attained by means of a wheel and rotation shaft assembly. The wheel has an axial hole passing therethrough to receive the rotation shaft. A blocking device is irremovably fastened on the rotation shaft before putting together the wheel and rotation shaft assembly. The wheel has at one extremity a circumferential succession of elastic laminas suitable for abutting behind a terminal head of a blocking device The present invention facilitates easy, fast and inexpensive assembly, and moreover is not subject to possible detachments of the wheel during operation.

BRIEF DESCRIPTION OF THE DRAWINGS

These and other features of the present invention shall be made more evident by the following detailed description of one of its embodiments illustrated as non-limiting examples in the enclosed drawings, wherein.

DETAILED DESCRIPTION OF THE DRAWINGS

Figure 1:
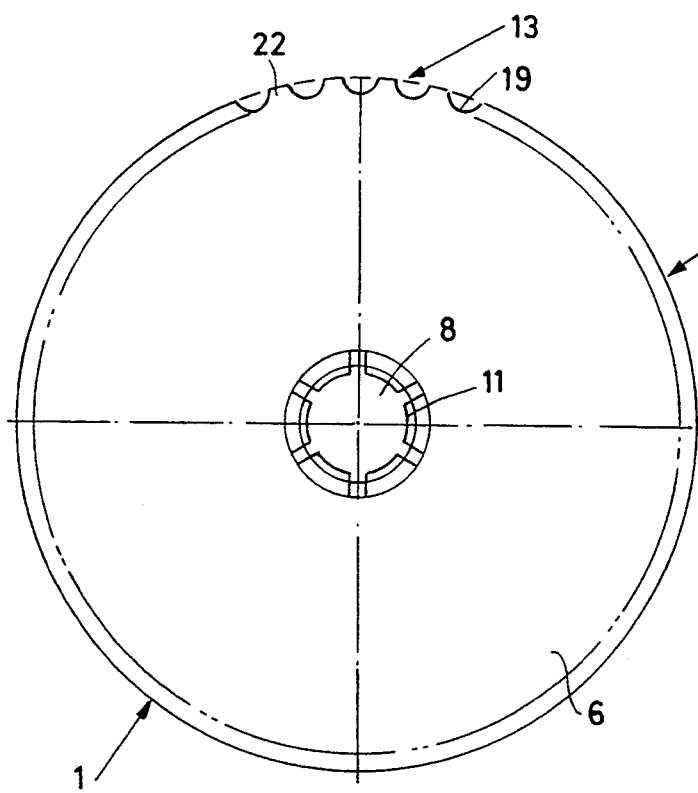
FIG. 1 represents a side view of the wheel from the inside of the cart.
Figure 3:
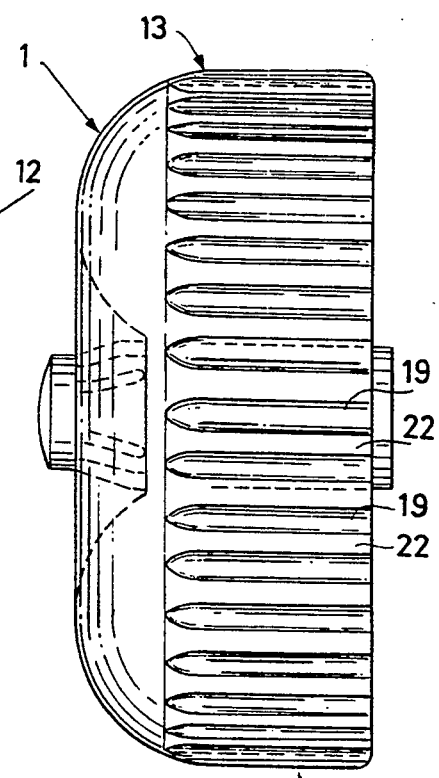
FIG. 3 represents a plan view from above of the wheel.
Figure 2:
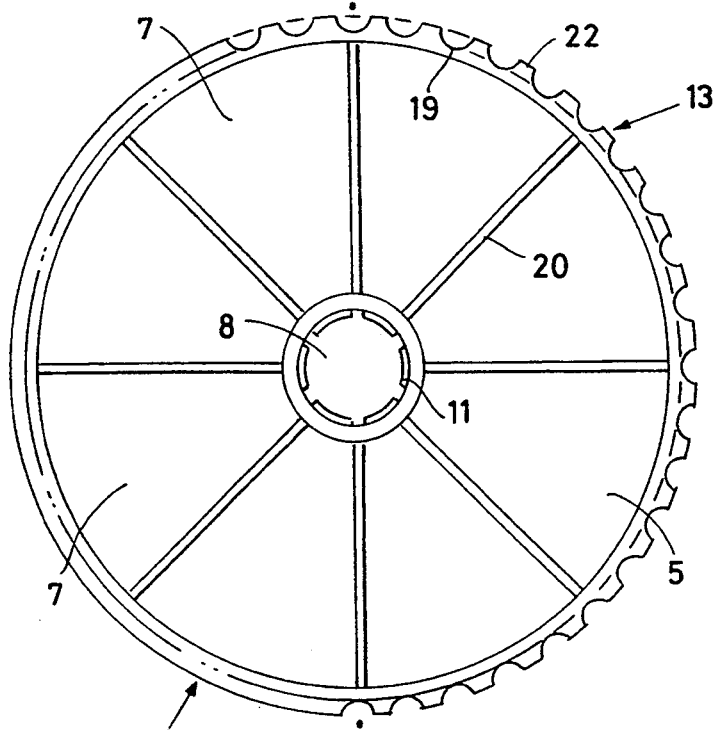
FIG. 2 represents a side view of the wheel from the outside of the cart.

With reference to the drawings, the present invention comprises a wheel 1, a rotation shaft 2 (see FIG. 5), and a device 3 for blocking the wheel, made integral with the rotation shaft 2 through different techniques.

With reference to FIGS. 1, 2, 3, and 4, the wheel 1 has differing internal and external faces 5, 6, respectively. Face 5 is hollow (see FIG. 4) and divided into segments 7 by radial spokes 20 (see FIG. 2). Face 6 is convex and structured to be completely filled.

Wheel 1 has a center hole 8 passing completely therethrough along its entire section. Hole 8 is coaxial with wheel 1 itself, and represents a space for receiving rotation shaft 2.

Figure 4:
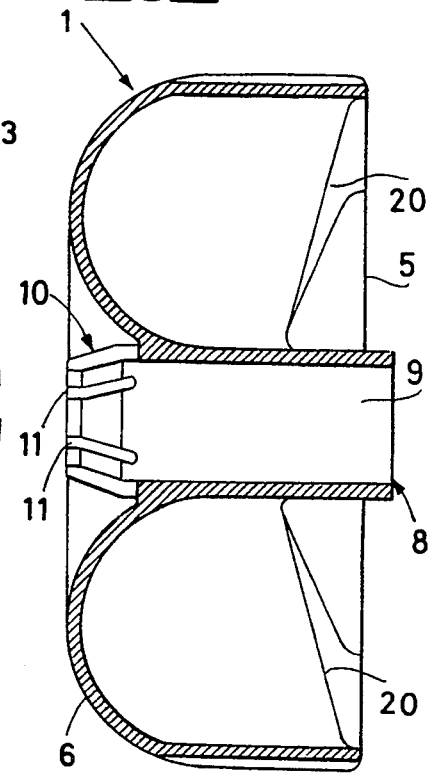
FIG. 4 represents a sectional view of the wheel taken along the line IV—IV of FIG. 2.

With reference to FIG. 4, hole 8 comprises two main hole portions 9 and 10. First hole portion 9 represents an actual receiving space, while second hole portion 10 is arranged so as to lock wheel 1 on rotation shaft 2. Second hole portion 10, protruding from external surface 6 of wheel 1, comprises a circumferential succession of elastic laminas 11. A slight inclination of laminas 11 toward the inside (e.g., axial center) of hole 8 determines a reduction in the diameter of hole 8 itself in the part whereat hole 8 protrudes from external surface 6 of wheel 1.

Rotation shaft 2 (which forms part of the unillustrated supporting structure of the hose-winding cart) is oriented in a horizontal position. Shaft 2 is comprised essentially of a hollow metal cylinder at whose extremities wheels 1 are mounted.

Figure 5:
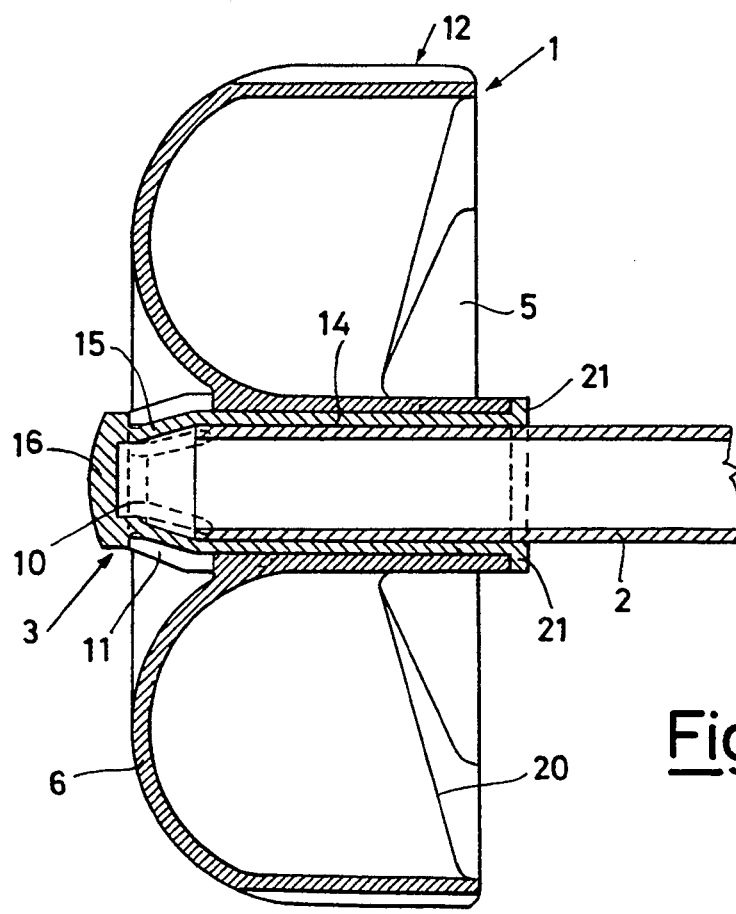
FIG. 5 represents a sectional view of the wheel mounted on a rotation shaft provided with a preassembled blocking device.
Figure 6:
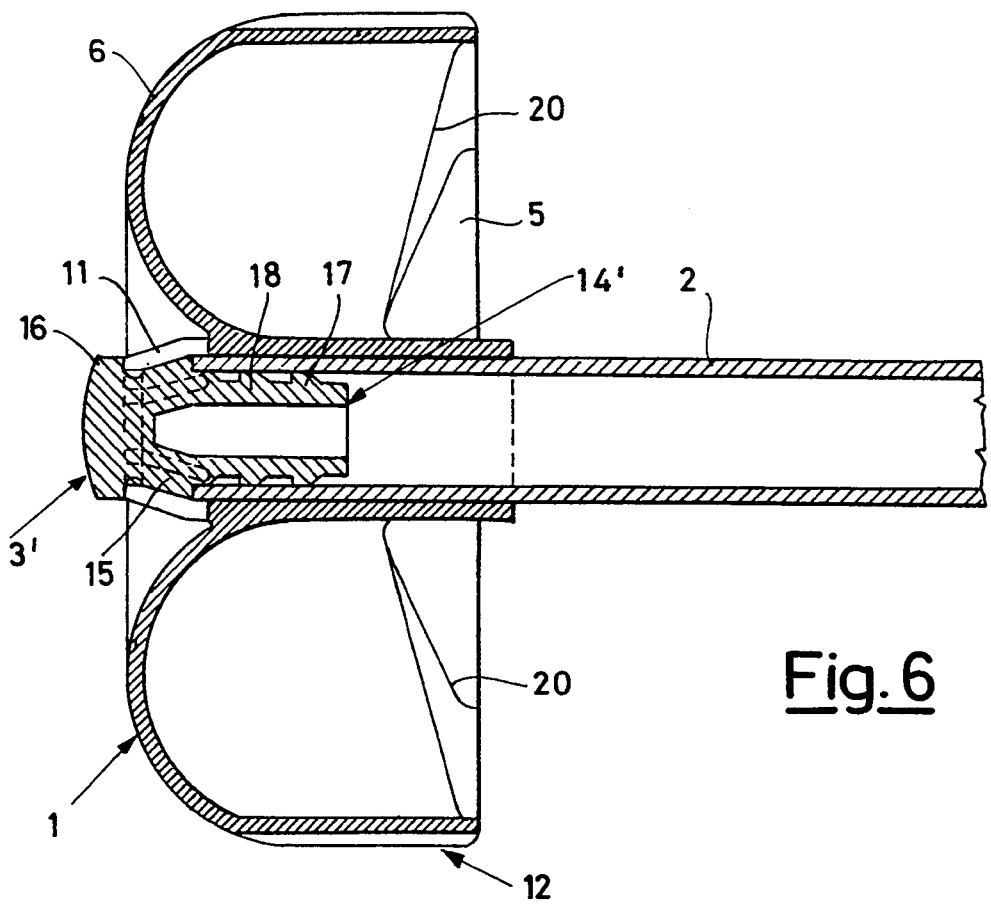
FIG. 6 represents a variant of the mounted sectional view shown in FIG. 5.

Blocking device 3 can be fabricated in various ways, as evidenced by a comparison of FIGS. 5 and 6. In any case, however, blocking device 3, preferably made of plastic material, is substantially divided into three portions 14, 15, and 16.

A first portion 14 of blocking device 3 has the function of making blocking device 3 integral with the rotation shaft 2. With reference to FIG. 5, portion 14 of blocking device 3 defines a cylindrical cavity whose internal diameter is equal to the external diameter of the rotation shaft 2, so as to allow a forced fit of shaft 2 in the cavity. A terminal flange 21 of portion 14 acts as a positioning shoulder and abutment for the mounted wheel.

As an alternative, with reference to FIG. 6, first portion 14' of blocking device 3' can be constituted by a casing having a cylindrical shape 18. The external diameter of portion 14' is smaller than the internal diameter of rotation shaft 2, and is provided with protrusions 17 on its lateral surface. Protrusions 17 increase (in the sense of the diameter) the extent of device 3 actually occupied by portion 14', thereby allowing a perfect fit of blocking device 3' in rotation shaft 2, thus making components 3' and 2 integral.

With reference to FIGS. 5 and 6, second portion 15 of the above-mentioned blocking devices 3 and 3' are comprised, for each of the mentioned variants, by a hollow frustum-shaped structure, integral with portions 14 or 14' described above. Second portion 15 has a larger base which is coincident with the base of the hollow cylinder constituting portion 14 as regards the first variant (FIG. 5), and with the base of the cylinder constituting rotation shaft 2 as regards the second variant (FIG. 6).

The third and last portion 16 of blocking device 3, which is also integral with the two portions 14 and 15 already described, is comprised of a circular-shaped head. Head 16 is coaxial with the above-mentioned portions 14 and 15 and with a diameter equal to the external diameter of portion 14, as regards the first variant (FIG. 5), and to the external diameter of rotation shaft 2 as regards the second variant (FIG. 6).

Going back to FIGS. 1, 2, 3, and 4, the lateral surface 12 of wheel 1 has a tread 13. Tread 13 is comprised of a circumferential succession of protrusions 22 and recesses 19, provided in a single piece forming the lateral surface 12 itself.

As an alternative, tread 13 can be obtained by means of a layer of a special plastic material (modified polyolefines), applied in an irremovable manner as by injection on the lateral surface 12 of wheel 1, with which it remains integral.

With reference to the drawings, the wheel and rotation shaft assembly is put together in two successive steps. First, blocking device 3 (or 3') is fixed to the rotation shaft 2, so as to be integral therewith (FIGS. 5 and 6). The second step comprises mounting wheel 1 on the rotation shaft 2. Step 2 is carried out by inserting the terminal part of rotation shaft 2 (including the blocking device 3 or 3' fitted thereon via step 1) inside hole 8 of wheel 1. The elastic laminas 11 that cover the external terminal part of hole 8 allow the passage of head 16 of blocking device 3 in one direction only and thus allow, once the head has passed, the complete and final blocking of wheel 1 on rotation shaft 2.

I claim:

1. A wheel and rotation shaft assembly comprising:
   a rotation shaft;
   a wheel having an axial hole passing therethrough to receive the rotation shaft, a circumferential series of elastic laminas being provided on the wheel to form an end portion of the axial hole;
   a blocking device having a portion thereof axially fitted with the rotation shaft prior to reception of the rotational shaft by the wheel, the blocking device further having a terminal head portion which is engaged by the elastic laminas of the wheel after reception of the rotation shaft and blocking device by the wheel.

2. An assembly according to claim 1, wherein the blocking device comprises a first portion which includes a hollow cylinder fitted over the rotation shaft and provided with a terminal flange that acts as a positioning shoulder and abutment for the wheel, wherein the blocking device further comprises a second portion which includes a hollow frustrum-shaped structure having a base coterminous with a base of the hollow cylinder of the first portion, and wherein the head portion is comprised of a circular-shaped head, coaxial and integral with the first and second portions.

3. An assembly according to claim 1, wherein the blocking device comprises a first portion which includes a casing having a cylindrical shape, the casing having an external diameter which is smaller than the internal diameter one of the rotation shaft, wherein the casing is provided with protrusions on its lateral surface, for fastening the blocking device to the rotation shaft, wherein the blocking body further comprises a second portion which is integral with said first portion and which is constituted by a hollow frustrum-shaped structure having a larger base which coincides with a base of the cylinder constituting the rotation shaft, wherein the blocking body head portion comprises a circular-shaped head, coaxial and integral with the first and second portions, whose diameter is equal to the external diameter of the rotation shaft.

4. An assembly according to claim 1, wherein the wheel has an internal face divided into segments by radial spokes and a convex external face.

5. An assembly according to claim 1, wherein the wheel has a lateral surface with a tread, the tread comprising a circumferential succession of protrusions and recesses formed in the lateral surface.

6. An assembly according to claim 1, wherein the wheel has a lateral surface with a tread comprising a layer of plastic material injected in on the lateral surface of the wheel.

7. An assembly according to claim 6, wherein said plastic material comprises modified polyolefines.

* * * * *